May 26, 1953

J. D. COBINE 2,640,135

ELECTRODE

Filed March 30, 1950

2 Sheets-Sheet 1

Inventor:
James D. Cobine,
by Paul G. Frank
His Attorney.

May 26, 1953  J. D. COBINE  2,640,135
ELECTRODE
Filed March 30, 1950  2 Sheets-Sheet 2
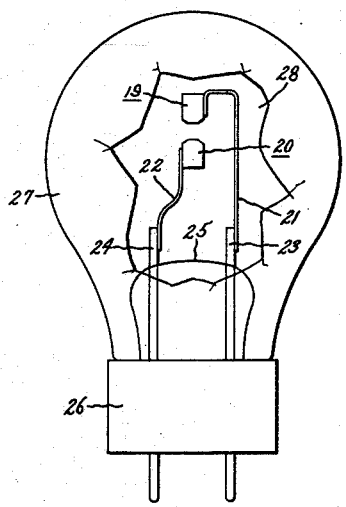
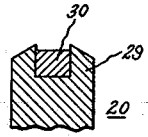
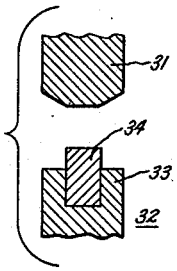
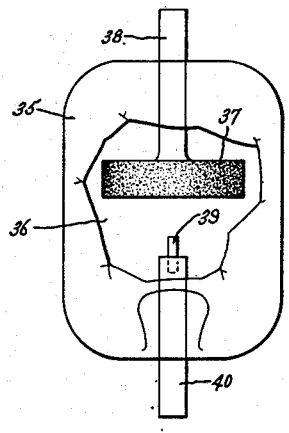
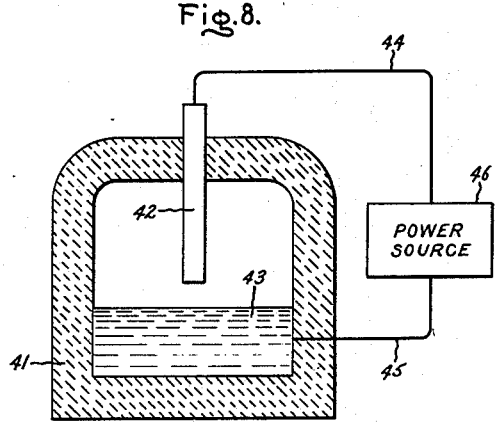
Inventor:
James D. Cobine,
by Paul G. Frank
His Attorney.

Patented May 26, 1953

2,640,135

UNITED STATES PATENT OFFICE 2,640,135

ELECTRODE

James D. Cobine, Schenectady, N. Y., assignor to General Electric Company, a corporation of New York Application March 30, 1950, Serial No. 152,973

12 Claims. (Cl. 219—8)

This invention relates to electrodes. More particularly, it relates to electrodes used in producing electrical arcs and to the process of making such electrodes.

Tungsten fabricated into a suitable form, such as a rod is often employed as an electrode in producing electric arcs for inert arc welding, electric arc furnaces, rectifiers, light sources and the like. In order to produce a stable arc, or one which will not wander over the arcing end of the electrode and up its sides, the electrode is operated at such temperature that it is incandescent. At these temperatures, which are at or near the boiling point of the tungsten, the arc current is supplied mainly by thermionic emission from the electrode. The high temperatures result in the loss of metal from the electrode, thus shortening its life. The necessity for having the electrode at incandescent heat in order to maintain a stable arc also limits the current which can be used with an electrode of any particular diameter or size. Too large an electrode for a given current will not become incandescent and will, therefore, not maintain a stable arc. An electrode of too small a diameter of the current used will evaporate too rapidly.

Another disadvantage of tungsten electrodes is the excessively high current and voltage necessary to start a stable arc in inert gas-shielded arc welding. For example, a tungsten electrode about 0.10 inch in diameter requires a starting current of about twenty to thirty amperes and a potential of about 190 volts D.-C.

An object of the present invention is to provide an electric arcing electrode which permits instant starting and stable arc at low currents.

Another object of the present invention is to provide an electrode which will start instantly at low open circuit generator voltages.

It is a further object of the invention to provide a non-consumable arcing electrode which operates at temperatures below the operating temperature of tungsten alone with substantially no loss of material.

It is still a further object of this invention to provide an instant starting and stable arc electrode comprising sintered tungsten and thoria.

Figure 1A:
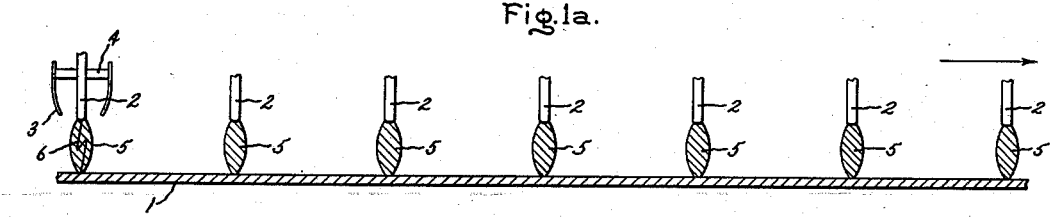
Figure 1B:
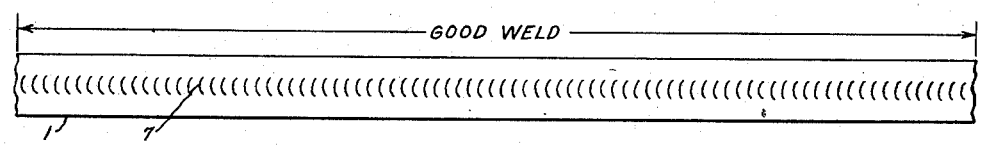
Figure 2A:
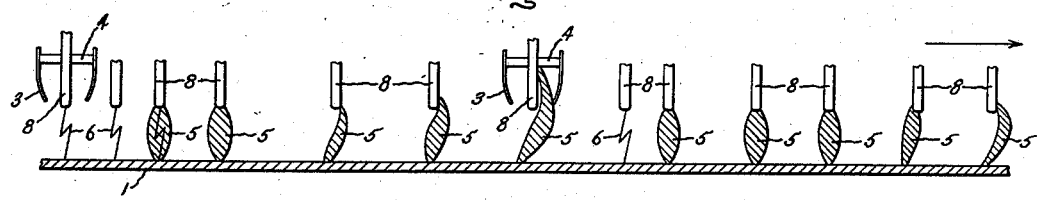
Figure 2B:
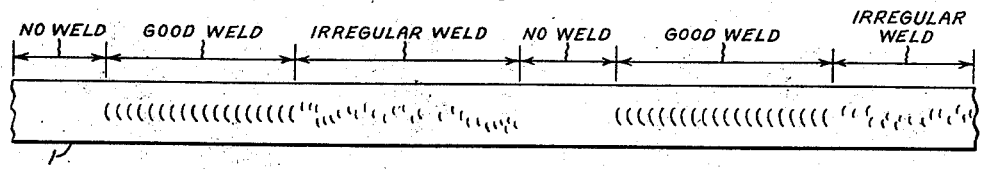
Figure 3:
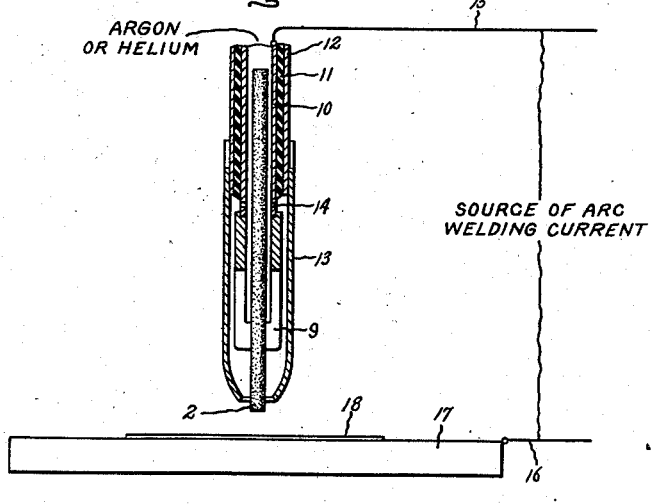

Other objects will become apparent from a consideration of the following description and the drawing in which Figs. 1a and 1b show schematically the typical action of the welding arc produced with the present electrode; Figs. 2a and 2b show the analogous action of a plain tungsten electrode; Fig. 3 shows conventionally an inert gas arc welding torch in section having the electrode described herein; Fig. 4 shows the present electrode in use as a light source; Figs. 5 and 6 show several configurations of electrode structure for use in light sources; Fig. 7 shows the use of the electrode material in a rectifier and Fig. 8 shows its use in an electric arc furnace.

It has been found that an instant starting and stable arc may be formed by using an electrode comprising sintered tungsten, thoria and tantalum.

More particularly, it has been found that an instant starting and stable arc for various applications may be formed by using an electrode consisting of tungsten, thoria and tantalum in the ratio of about one hundred parts by weight of tungsten to about five to forty-five parts by weight of thoria and about 0.5 to five parts by weight of tantalum. A preferred range of compositions for the present electrode is one hundred parts by weight of tungsten to about five to twenty-five parts by weight of thoria and one to five parts by weight of tantalum. The specific preferred composition for the present electrode is one hundred parts by weight of tungsten, fifteen parts by weight of thoria and three parts of tantalum.

In inert gas-shielded arc welding the use of the present electrode results in instant starting of the arc when a high frequency spark is applied or the electrode is touched to the work and withdrawn. The arc thus produced is also stable and steady, the cathode spot remaining at the arcing tip of the electrode and not wandering up its sides. The open circuit voltage of the welding generator required for starting an arc with the present preferred electrode is very low, being about twenty-four volts D.-C. for an electrode about 0.10 inch in diameter. On the other hand, a tungsten electrode of the same diameter requires an arc-starting open circuit voltage of about 190 volts D.-C. The low voltage starting characteristic of the present electrode permits the use of smaller welding generators than would otherwise be required.

The instant starting and stable arc maintenance of the present electrode produces steady uniform welds with no irregularities. The action of the present electrode is shown in Figs. 1a and 1b. The work piece is represented by 1 and the electrode 2 is held in nozzle 3 and collet 4, the latter being schematically shown and depicted in only one instance for the purpose of simplifying the figure. The arc 5 starts instantaneously with the imposition of a high frequency spark 6 and remains stable, unwavering and unmoving as shown as the electrode is moved along the work piece 1 in the direction of the arrow to produce the regular uniform weld shown at 7 in Fig. 1a. This action, characteristic of inert gas-shielded arc welding with the present electrode, is radically opposed to that experienced when using a plain tungsten electrode in automatic welding where the electrode and the work are started moving relative to one another when the high frequency arc-starting spark is imposed. The typical action of a plain tungsten electrode is illustrated in Figs. 2a and 2b. When the high frequency spark 6 is struck between work piece 1 and plain tungsten electrode 8 held in nozzle 3 and collet 4, the arc does not immediately become established, resulting in a blank space where no welding occurs on work piece 1 as shown in Fig. 2b. When arc 5 is established in steady state, a good weld results. However, the steady or stable state of the arc exists only a short time and then the cathode spot and arc wander over the tip of electrode 8 and finally up its sides as shown producing an irregular weld and damaging the nozzle 3 and collet 4. The wandering and wavering arc finally extinguishes, leaving an unwelded region on the work piece until a steady arc has been re-established only to repeat again its wavering and extinguishing to the detriment of the quality of the weld produced on the work piece.

A further disadvantage of the plain tungsten electrode is that the tip becomes molten and rounded as the cathode spot wanders about its edges. This melting of the electrode tip and the formation of a globule of molten metal thereon charges the arc gap distance which may cause the arc to extinguish or produce poor welds. The molten and incandescent condition of the plain tungsten tip in actual use is also conducive to evaporation of the electrode or even loss of metal by separation or dropping of the molten globule from the electrode. On the other hand, the present electrode, operating as it does at lower and non-melting temperatures, is substantially, if not wholly, non-consumable. The end of the present electrode, being unmelted, will not change its shape as by formation of a molten globule of metal so as to require frequent adjustment of the arc gap distance. Once the arc gap is fixed, using the present electrode, it remains unchanged.

When the present tungsten, thoria and tantalum electrode is used, the disadvantages of the plain tungsten electrode are obviated. When the torch is placed in motion with the application of the high frequency spark, there is no blank spot in the work to be welded because the cathode spot and arc are immediately established. Furthermore, once established, the cathode spot and arc remain steady at the arcing tip or terminal of the electrode with no wandering or erratic behavior. The net result, when using the present electrode, is a steady uniform weld of high strength which is commenced simultaneously with the imposition of the high frequency spark and continues uninterruptedly until the work and torch are deliberately further separated or the current is cut off.

The advantages of the present electrode are further available when hand-held welding torches are used. In those cases in which the high frequency spark is used to start the cathode spot and arc, the procedure is much the same as in the use of the automatic machine as described above. When the arc is started by short circuiting the arc gap, employment of an auxiliary carbon starting block or plate is recommended. In using such a block or plate, it is placed immediately adjacent the start of the weld, the electrode being touched to it and withdrawn to establish the arc, the arc and the torch being then moved over to the work. Such a method avoids contaminating the material to be welded with the electrode material. Thereafter, if the torch is used by an experienced operator, the only occasion for the extinguishment of the arc is a cutting off of the current when the weld is completed.

As pointed out above, the composition of the present electrodes may include one hundred parts by weight of tungsten, from five to forty-five parts by weight of thoria and from 0.5 to five parts by weight of tantalum. Amounts of thoria below five parts by weight in the above composition produce an electrode, the characteristics of which so approach that of plain tungsten that the advantages described herein are not attained. Amounts of thoria exceeding forty-five parts by weight in the above composition tend to cause melting under high currents. In this connection, the present electrode is to be distinguished from the so-called "thoriated tungsten" as known in the illuminating art which usually contains up to about 1.5 percent of thoria.

The tantalum produces an electrode of such increased strength as to make practical the use of otherwise fragile electrodes in conventional torches which clamp the electrode in place as by means of collets. A minimum of about 0.5 part by weight of tantalum is indicated to obtain requisite strength. As the tantalum content of the composition is increased above five parts by weight, the electrodes tend to crack when being sintered and also to adhere to one another when stacked in the heat treating furnace. Vanadium and columbium or niobium may be used in place of the tantalum but the latter is preferred.

Preferably, the thoria is used in amounts of ten to twenty-five parts by weight for each one hundred parts by weight of tungsten and one to five parts by weight of tantalum.

The preferred specific composition of the electrode described herein is one hundred parts by weight of tungsten, fifteen parts by weight of thoria and three parts by weight of tantalum. Such electrodes start consistently at an initial open circuit voltage of about twenty-eight volts which is reduced to about twenty-four volts after arcing for about one minute. The voltage is not changed after one hour of arcing at about 175 amperes. An electrode of this preferred specific composition and of 0.10 inch diameter will start consistently at ten amperes and has a current range of from about eight to 375 amperes. A plain tungsten electrode of the same size has a much more restricted current range of from about 140 to 280 amperes and requires an open circuit starting voltage of about 190 volts D.-C. for high frequency spark starting.

The composition containing five parts by weight of thoria has an open circuit starting voltage of forty volts D.-C. for a 0.10 inch diameter rod, this potential rising to about forty-five volts after arcing at 120 amperes. This composition constitutes the lower limit for electrodes which are most useful in the present applications. A 0.10 inch diameter electrode containing ten parts by weight of thoria requires an open circuit starting voltage of twenty-five volts D.-C. which increased to thirty volts after arcing at 200 amperes. Larger amounts of thoria than the fifteen parts by weight per one hundred parts by weight of tungsten appear to offer no advantage. While, as pointed out above, the electrode containing fifteen parts by weight of thoria has an open circuit starting voltage of twenty-eight volts which reduces to twenty-four volts, twenty-five parts by weight of thoria, gives an open circuit starting voltage of about 22.5 volts D.-C. However, the slight decrease in starting voltage of about one and one-half volts does not warrant the addition of the larger amount of thoria, especially since the arc starts or stabilizes no better than with the fifteen parts by weight of thoria.

The sintered tungsten-thoria-tantalum electrode may be fabricated in any of a number of ways which will occur to those skilled in the art. A typical manner of preparing the present electrodes is as follows:

Powdered tungsten, thoria and tantalum are ball-milled in the dry state until throughly mixed; usually several hours is sufficient. To produce an electrode having the preferred composition, for example, the mixture would consist of 100 parts by weight of tungsten, fifteen parts by weight of thoria and three parts by weight of tantalum. For practical purposes it is preferable to use in lieu of tantalum metal, a tantalum compound such as tantalum hydride, carbonate, oxide and the like to provide the required amount of tantalum.

The above mixture may be pressed dry in suitable molds under a pressure of about 5000 pounds per square inch to produce dense, void-free rods which are ready for firing or sintering. The sintering process should be carried out preferably in a reducing or non-oxidizing atmosphere such as that which is afforded by hydrogen. The temperature of the furnace should reach a temperature of the order of 2000° C. A suitable sintering procedure is to place the rods in a hydrogen atmosphere furnace at room temperature and gradually and uniformly raise the temperature to about 1950° C. over a period of about five hours, holding the temperature constant at 1950° C. for about thirty minutes and cooling gradually to room temperature with the furnace shut off. The sintered rods may, if desired, be heated to about 2100° C. to 2400° C. for five to ten minutes in an argon atmosphere or in a vacuum to remove absorbed hydrogen. This treatment reduces the electrical resistivity and increases the strength of the rods. For the present welding electrodes an equivalent effect is produced when an arc is first drawn so that the heat treatment in vacuum or argon is not essential so long as care is taken in handling the electrodes prior to arcing. However, the above argon or vacuum treatment is recommended when the rods are to be stored or handled to any extent.

While a specific time-temperature sintering treatment has been described above, it will be readily appreciated by those skilled in the art that shorter or longer times of treatment may be used depending on the temperature used. With higher temperatures, a shorter period may be used while at lower temperatures the treatment should be longer.

Alternatively, the present electrodes may be produced by the extrusion process. In this case there should be mixed with the dry constituent materials a paste material such as of sugar syrup or tragacanth or flour and water which will produce an extrudable mass and which will burn off or be otherwise removed during firing or sintering. An example of such a binder is a paste made from ordinary cereal flour of sufficient consistency to bond the electrode material prior to sintering. A suitable paste or binder may be made by cooking about ten parts by weight of wheat flour in one hundred parts by weight of water at 100° C. until the mixture is translucent. The binder may then be mixed thoroughly with the dry electrode materials in an amount to give proper extruding through regular dies. The extruded, raw rods are then dried and sintered as above.

In operation, the improved electrode of this invention may be used in any conventional inert gas-shielded arc welding apparatus, a typical form of which is illustrated in Fig. 3. As shown, the present electrode 2 is held in a spring collet 9 which in turn is attached to tube 10 which is preferably of copper. Electrode 2 may extend into tube 10 which serves as a means for supplying inert gas, such as argon or helium, about the electrode and also serves as a conductor for carrying the welding current to electrode 2 through collet 9. Tube 10 is surrounded by an electrically insulating sleeve 11 which, in turn, is surrounded by a protecting casing 12 of some durable material such as iron or steel. Nozzle 13 is frictionally engaged with one end of casing 12 and provides a chamber enclosing the end of tube 10 and collet 9 mounted thereon. Shielding gas supplied through tube 10 flows into the above chamber through a plurality of holes 14 in the side walls of tube 10 and is discharged from nozzle 13 about the arcing terminal of electrode 2. One terminal of a source of arc welding current is connected by conductor 15 to tube 10 and the other terminal is connected by conductor 16 to a work-supporting table 17. Parts 18 to be welded are supported on table 17 with their edges adjoining lengthwise.

The advantages attained by the use of the present electrode do not depend upon any so-called fluxing action, the electrode material not entering the weld or forming a sheath over it. The only blanketing phenomenon present in welding according to this invention is that of the inert gases fed through the welding torch nozzle which shield the electrode and the molten part of the weld metal. There is no contamination of the weld or welded parts by any extraneous material and parts so welded are immediately available for further use without cleaning.

The use of the present non-consumable electrode enables the cathode spot and arc in inert gas-shielded arc welding to become immediately and permanently established on the tip of the tungsten electrode with no wandering or wavering of the cathode spot and arc up the sides of the electrode or onto other metallic parts of the welding torch or fixture. Once established the only occasion for extinguishing of the arc is deliberately and excessively increasing the arc gap distance or cutting off the current. The electrode of this invention is also unique in that there is provided a mechanically strong electrode which in integral form provides a stable steady arc without the use of coatings and the like on the electrode or material to be welded which is easily displaced.

Electrodes of the present composition have also been found very useful as light sources. In this connection it may be used in any of the usual atmospheres such as of mercury vapor and of the so-called inert gases and also nitrogen, carbon dioxide and hydrogen among others. In such use a conventional tube structure, such as that shown in Fig. 4, may be used. In the figure the electrodes of the present invention 19 and 20 are fixed to support rods 21 and 22 respectively which in turn are fixed to contact members 23 and 24. Contact members 23 and 24 pass through the stem press 25 and base 26 of the lamp which are enclosed in glass envelope 27 filled with gas 28. When the lamp is operated under A.-C. current it is preferred to use electrode elements, such as are shown more clearly in Fig. 5, wherein the electrode 19 or 20 consists of a recessed tungsten holder 29 containing a mass of the present sintered electrode material 30 which is inserted therein. It is preferable to recess the material 30 slightly within holder 29 as shown when operated under A.-C. current to prevent damage to the electrode material during the half cycle when the electrode serves as anode.

When the lamp is operated under D.-C. it is preferred to use dissimilar electrodes, the present material being used as cathode with plain tungsten used as anode. This arrangement is illustrated in Fig. 6 wherein the anode 31 is of plain tungsten. The cathode 32 consists of a holder 33 of tungsten in which has been inserted a mass 34 of the present tungsten-thoria-tantalum material.

The above arc lamp operates very satisfactorily under a starting voltage of twenty-five volts D.-C. and ten amperes using electrode material 0.125 inch in diameter. Such a lamp having an argon filling at atmospheric pressure gives a light output of 59,000 lumens at 200 amperes at an efficiency of about 13.5 lumens per watt. The light from the arc is steady in character with no flickering, the cathode spot and arc remaining fixed at one place at the arcing tip of the electrode. Arc lamps using the present electrode may also be used as flash lamps and in such role show very long life with no fluttering or flickering of the arc light source.

The present electrode material may also be used to advantage in the so-called cold cathode rectifier shown in Fig. 7. In the sealed glass envelope 35, filled with an inert gas 36 such as argon, is mounted an anode 37 on a suitable conducting support 38. Preferably the anode is of graphite or similar material and has a relatively large circular surface. The cathode 39 of the present sintered tungsten-thoria-tantalum is inserted in a suitable holder 40 such as a tungsten rod. Using a cathode 39 about one-sixteenth inch in diameter and an anode about one and one-half inches in diameter the rectifier has a current rating of the order of one hundred amperes.

The electrodes of this invention may also be used with excellent results in electric arc furnaces in which the arcing electrode is used as the cathode and the melt or material to be melted as the anode. An arrangement of such an arc furnace is shown in Fig. 8 wherein the furnace 41 is shown in cross-section with the present electrode 42 projecting through the top of the furnace to within arcing distance of melt 43. The electrode 42 and melt 43 are connected through conductors 44 and 45 respectively to a power source 46. The use of the present electrode in such a furnace obviates the wandering of the cathode spot and arc up the sides of the electrode, provides a steady arc of maximum efficiency and prevents accidental over-extension and extinguishment of the arc.

What I claim as new and desire to secure by Letters Patent of the United States is:

1. A sintered, non-consumable, inert gas shielded arc welding electrode which is capable of starting an arc instantly and maintaining a stable arc at temperatures below its incandescent temperature, said electrode comprising, by weight, one hundred parts of tungsten, from five to forty-five parts of thoria and from one-half to five parts of a metal chosen from the group consisting of tantalum, vanadium, and niobium.

2. A sintered non-consumable electrode comprising by weight one hundred parts of tungsten, five to forty-five parts of thoria and one-half to five parts of a metal chosen from the group consisting of tantalum, vanadium and niobium.

3. A non-consumable electrode which is capable of starting an arc instantly and maintaining a stable arc, said electrode comprising one hundred parts by weight of tungsten, from about five to forty-five parts by weight of thoria and from about one-half to five parts by weight of tantalum.

4. A non-consumable electrode which is capable of starting an arc instantly and maintaining a stable arc, said electrode comprising by weight one hundred parts of tungsten, from about five to twenty-five parts of thoria and one to five parts of tantalum.

5. An electrode which is capable of starting an arc instantly and maintaining a stable arc, said electrode comprising by weight about one hundred parts of tungsten, about fifteen parts of thoria and about three parts of tantalum.

6. An electrode which has instant starting and stable arc operating characteristics when energized by welding circuits providing open circuit voltages as low as about twenty-five volts D.-C., said electrode comprising by weight about one hundred parts of tungsten, about five to forty-five parts of thoria and about one to five parts of tantalum.

7. In arc lighting apparatus, a sintered electrode comprising, by weight, one hundred parts of tungsten, from five to forty-five parts of thoria and from one-half to five parts of a metal chosen from the group consisting of tantalum, vanadium, and niobium.

8. In rectifier apparatus, a sintered electrode comprising, by weight, one hundred parts of tungsten, from five to forty-five parts of thoria and from one-half to five parts of a metal chosen from the group consisting of tantalum, vanadium, and niobium.

9. In an electric arc furnace, a sintered electrode comprising, by weight, one hundred parts of tungsten, five to forty-five parts of thoria and from one-half to five parts of a metal chosen from the group consisting of tantalum, vanadium, and niobium.

10. In inert gas shielded arc welding apparatus, a sintered electrode comprising, by weight, one hundred parts of tungsten, from five to forty-five parts of thoria and from one-half to five parts, by weight, of a metal selected from the group consisting of tantalum, vanadium, and niobium.

11. A sintered non-consumable electrode which is capable of starting an arc instantly and maintaining a stable arc, said electrode comprising one hundred parts by weight of tungsten and five to forty-five parts by weight of thoria.

12. A sintered non-consumable electrode which is capable of starting an arc instantly and maintaining a stable arc, said electrode comprising one hundred parts by weight of tungsten and fifteen parts by weight of thoria.

JAMES D. COBINE.

References Cited in the file of this patent

UNITED STATES PATENTS

| Number | Name | Date |
|---|---|---|
| 982,751 | Thowless | Jan. 24, 1911 |
| 1,918,212 | Palmer | July 11, 1933 |
| 1,977,361 | Taylor | Oct. 16, 1934 |
| 2,314,628 | Pavlecka | Mar. 23, 1943 |
| 2,473,601 | Labosco | June 21, 1949 |
| 2,515,559 | Lancaster et al. | July 18, 1950 |

FOREIGN PATENTS

| Number | Country | Date |
|---|---|---|
| 8,421 | Great Britain | 1908 |
| 20,227 | Great Britain | 1907 |